Nov. 24, 1970 T. J. STOLKI 3,541,846
STRAIN TESTING DEVICE
Filed Oct. 21, 1968 2 Sheets-Sheet 1
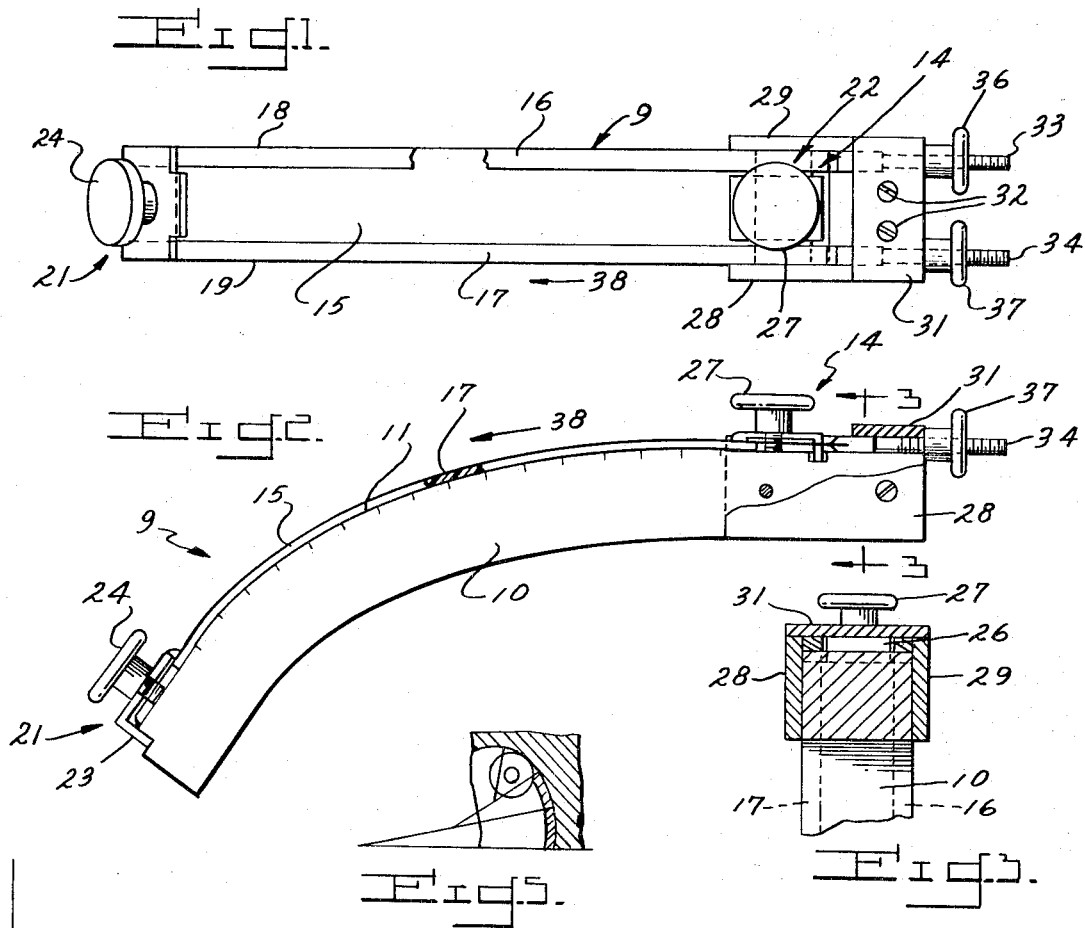
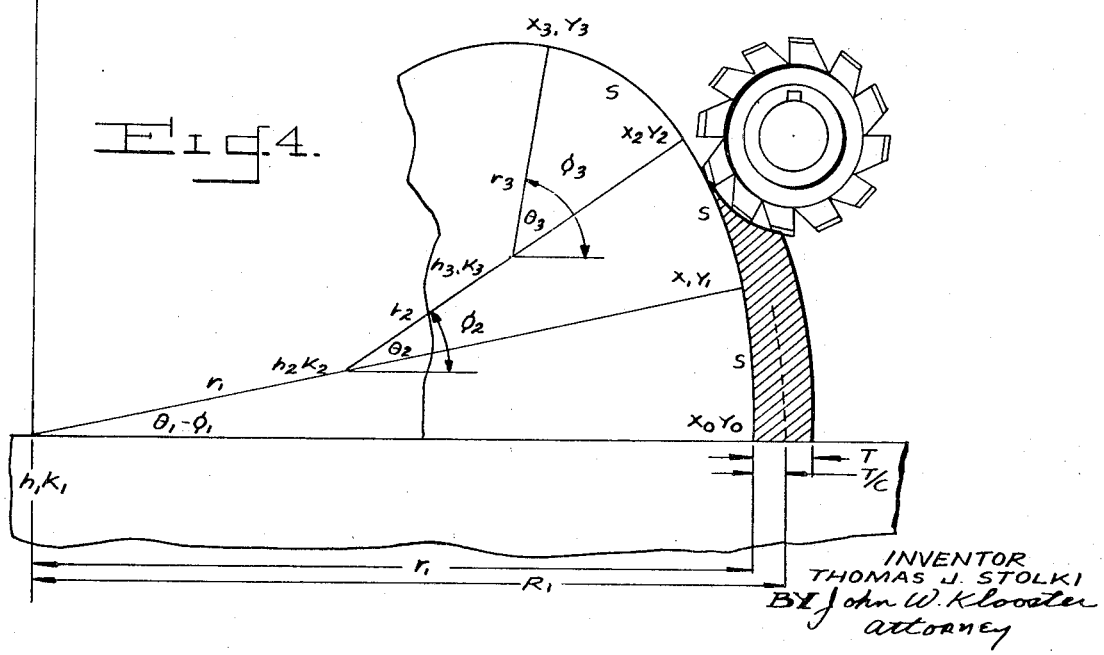
INVENTOR
THOMAS J. STOLKI
BY John W. Klooster
attorney

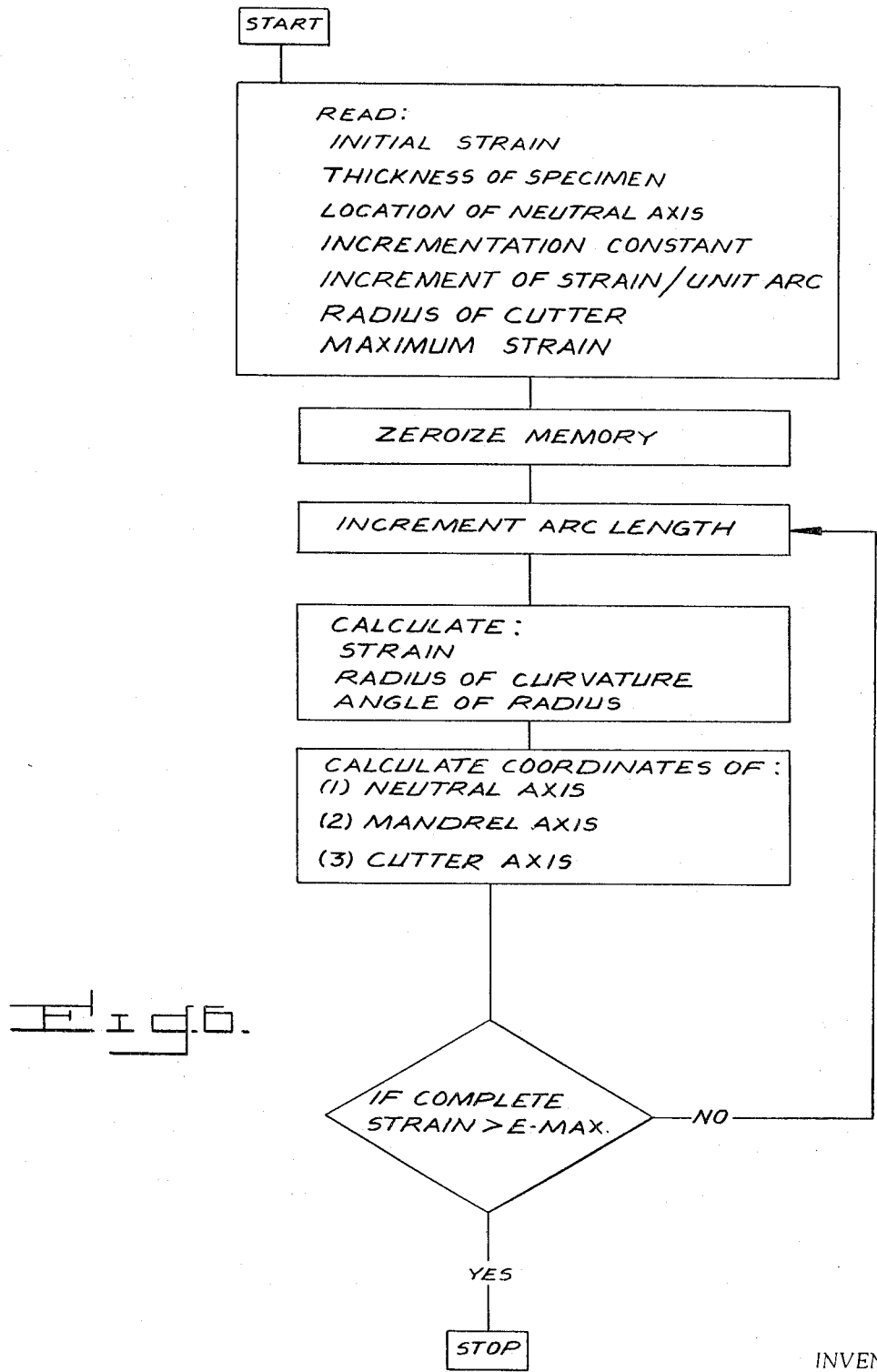

United States Patent Office 3,541,846
Patented Nov. 24, 1970

3,541,846
STRAIN TESTING DEVICE
Thomas J. Stolki, Wilbraham, Mass., assignor to Monsanto Company, St. Louis, Mo., a corporation of Delaware
Filed Oct. 21, 1968, Ser. No. 769,200
Int. Cl. G01n 3/20
U.S. Cl. 73—100                                4 Claims

ABSTRACT OF THE DISCLOSURE

A strain testing device in which a sample of material in sheet form is adapted to be clamped in a controlled configuration such that strain in such sample varies linearly with distance along such sample. When using this device, one clamps a sample of material such as plastic thereinto, usually exposes the so-clamped sample to a controlled environment, and thereafter examines the sample for strain cracks. The positioning of the strain cracks indicates the limitations in strain characteristics inherently associated with the material in the sample tested.

BACKGROUND

The need for basic design engineering data on sheet materials becomes more urgent with the increasing use of thermoplastic polymers in packaging and appliance applications. Both the short and long term effects of "aggressive" environments which come in contact with a sheet material during its useful life need to be known. One of the more important, and often least understood, physical properties of sheet materials that must be considered, especially in packaging and appliance usage, is their chemical resistance under external loads.

A rapid and accurate procedure is needed to quantify the chemical resistance, or extent of damage caused by various environments. Load situations encountered in practice are generally either constant stress or constant strain (constant with time).

For the past several years, groups such as ASTM Committee D-20 (Sub-committee V—Permanence Properties) have concerned themselves with the development of a test in the flexural mode for environmental stress cracking of rigid thermoplastics. This led to an evaluation of the constant strain performance of transparent homopolymers on an elliptical bending form based on the design of Ziegler (see E.E. SPE Journal, 10, No. 4, 12 (April 1954).

Recently, it has been found that such an elliptical test form is inadequate, since the test specimens lift off the form in the presence of swelling environments. Also, some difficulty has been experienced in getting the sample to conform to the elliptical shape over its whole length. In certain areas, the specimen "bows out" from the form to some preferred configuration and therefore changes the strain distribution over the specimen length.

Another disadvantage of the elliptical shape is the inherent increased test error present when determining the "critical strain" caused by the non-linear strain to specimen lentgh relationship near the apex of the ellipse. (The "critical strain" is the minimum strain that produces a noticeable physical change in a specimen or sample sheet in the presence of a given environment.) Strain changes more rapidly with specimen length as the apex is approached, and the test precision necessarily decreases.

By the present invention, there is provided an improved device for flexing sheet materials which overcomes the objections of prior art testing techniques by (a) incorporating a positive specimen clamping mechanism, and (b) having a contour permitting a linearly increasing outer fiber strain with specimen length. This device provides a rapid and more accurate measurement of the critical strain over the entire test area.

There is also provided by the present invention, a method for evaluating the constant strain chemical resistance of polymers, including the determination of the chemical resistance of opaque, high impact rubber modified resins, in addition to that of transparent homopolymers and copolymers. The method is not dependent upon the composition of the specimen evaluated.

DRAWINGS

For a better understanding of the invention, reference is made to the following description taken in conjunction with the accompanying drawings in which:

FIG. 1 is a top plan view of one embodiment of a testing device of this invention;

FIG. 2 is a side elevational view of the device shown in FIG. 1;

FIG. 3 is a vertical sectional view taken along the line 3—3 of FIG. 2;

FIG. 4 is a diagrammatic representation showing geometrical considerations of a milling machine operation in which the convexly curved surface of the mandrel employed in the device of FIGS. 1, 2 and 3 is being made;

FIG. 5 is a simplified representation similar to FIG. 4 but showing production of a concavely curved surface which is the inverse of that shown in FIG. 4 but which is useful as a mold element in forming the device of FIGS. 1, 2 and 3, and FIG. 6 illustrates a computer program suitable for use in generating the surface illustrated in FIGS. 4 and/or 5.

SUMMARY

Turning to the drawings, there is seen in FIGS. 1–3 one embodiment of a strain testing device of this invention, herein designated in its entirety by the numeral 9. The device 9 includes an elongated mandrel 10 which has a curved surface 11. Curved surface 11 is transversely flat but convexly curves in a longitudinally extending direction with respect to the mandrel 10. The mandrel 10 can be formed of any convenient material such as metal, plastic, or the like. The particular material used to make a given mandrel 10 depends upon the particular type of use to which the device 9 is to be employed. Obviously, one chooses a material for constructing mandrel 10 which will be relatively inert under the particular environment test conditions to be employed when using the strain testing device 9.

The device 9 is equipped with clamping means, herein designated in its entirety by the numeral 14, which functionally is associated with the mandrel 10 and is adapted to hold a specimen 15 uniformly in face-to-face engagement with surface 11 of mandrel 10. Specimen 15 is in sheet form and is composed of a material having generally uniform composition and thickness characteristics. Typically and preferably, the material of the specimen 15 is a polymer such as a homopolymer, copolymer, graft copolymer, homogeneous mixture of different polymers or the like.

In the device 9, the clamping means 14 includes a pair of flexible bands 16 and 17, respectively. These bands are preferably composed of a flexible but relatively inelastic material such as steel, or the like. Each band 16 or 17 is so-oriented relative to surface 11 as to extend longitudinally thereover in the region of a different respective side edge 18 and 19 thereof.

To hold opposite end regions of each band 16 and 17 in face-to-face engagement with surface 11 of mandrel 10, a securing means is provided. Thus, two end clamps 21 and 22, respectively, are provided. End clamp 21 comprises a shoe 23 and a knurled thumb screw 24, the shank of which (not shown) extends freely through shoe 23 and threadably engages a mating socket (not shown) in mandrel 10. Observe that shoe 23 is formed so as to exert a clamping action upon the trailing end of the sample specimen 15.

End clamp 22 comprises a shoe 26 and a knurled thumb screw 27, the shank of which (not shown) extends freely through shoe 26 and threadably engages a mating socket (not shown) in mandrel 10. Although the respective bands 16 and 17 are rigidly fixed to shoe 23, these bands do not engage shoe 26 but the respective opposite side edges of shoe 26 cooperate with a pair of flanges 28 and 29 fastened to mandrel 10 in the region of shoe 26. Thus, the bands 16 and 17 ride in channels defined by the flanged edges 28 and 29 and by shoe 26.

A top plate 31 extends transversely across the end of mandrel 10 and is rigidly secured thereto by a pair of screws 32 which extend through top plate 31 and engage mating socket (not shown). Conveniently, top plate 31 butts into flanged edges 28 and 29 for rigidity.

A pair of screws 33 and 34 are provided. The forward end of each screw 32 and 33 is rigidly associated with a different band 16 and 17, respectively, as by welding, gluing (as with epoxy adhesive) or the like. Each screw 33 and 34 slides freely in a longitudinally extending channel. A knurled nut 36 and 37 threadably engages each respective screw 33 and 34 as the respective knurled nuts are tightened against the rigid combination of top plate 31 and mandrel 10 and respective bands 16 and 17 (depending upon which knurled nut 36 or 37 is turned) are stretched and tightened or loosened as respects face-to-face engagement of the bands 16 and 17 with the surface 11 of mandrel 10.

A procedure for mounting a specimen 15 in device 9 is as follows:

Knurled thumb screw 24 is turned so as to remove the end clamp 21 from the surface 11 or mandrel 10. At this point, a specimen 15 is inserted between the raised bands 16 and 17 and the surface 11 of mandrel 10. Usually and preferably, the edge of specimen 15 is indexed in relation to the shoe 26 so as to precisely align the specimen 15 on the surface 11. Thus, conveniently, one may desire to align the specimen 15 with ruled marks on the surface 11 (not shown) which serve to permit direct reading of the device 9, as those skilled in the art will appreciate. Next, the end clamp 22 is tightened by means of the thumb screw 27. Thereafter, the bands 16 and 17 are moved towards the surface 11 of mandrel 10 until the end clamp 21 can be secured to mandrel 10 by means of the knurled thumb screw 24. Knurled thumb screw 24 is tightened until the clamp is rigidly secured to mandrel 10. Now, knurled thumb screw 27 is loosened and at this point the knurled nuts 36 and 37 are tightened against the adjoining adjacent surfaces of top plate 31 and mandrel 10 so as to bring the surface of specimen 15 which is adjacent surface 11 into face-to-face engagement with one another. Finally, the knurled thumb screw 27 is retightened. Observe that for diagrammatic descriptive purposes, band 16 is broken away to demonstrate that the specimen 15 is there beneath. After specimen 15 is so mounted into the device 9, the entire assembly can be subjected to a controlled environment or alternatively direct reading of any cracks formed in the surface of specimen 15 can be read.

When a specimen 15 is so mounted in the device 9, the specimen 15 has been formed into a curved configuration which is transversely flat but which is convexly curved in a longitudinally extending direction. Because of the configuration of the curve, strain on the outer surface of the specimen 15 linearly increases with longitudinal distance along the surface 11 of specimen 15 in the direction indicated by the arrow 38.

It will be appreciated from the foregoing that the curvature associated with a surface 11 is dependent upon the thickness of a specimen that one desires to test. Assuming for purposes of illustration that one desires to have a linearly increasing strain with sample length and that the sample has a thickness of $\frac{1}{10}''$, the nature of the curvature associated with surface 11 becomes fixed when one desires to practice the present invention. The curvature associated with a given surface 11 can be made by any convenient means as those skilled in the art will readily appreciate. For example, one procedure is to mount a work piece in a milling machine and to carefully mill away portions of the work piece on an incremental basis until the desired curved surface 11 is produced. To accurately obtain a desired strain gradient along such a surface being such generated, one may employ a strain gauge to periodically measure the curvature at a given locus and thereby verify that the desired linearity relationship is being achieved. Of course, it is desirable and preferred when employing this procedure to cut away gradually since it is easier to cut away material than it is to restore a surface once the cut has been made to a greater depth than desired for purposes of obtaining the desired curvature.

It is easier, however, to establish in more precise terms a relationship between a work piece and a cutting edge prior to generating a surface 1; thus, FIG. 4 illustrates one procedure for calculating the coordinates of a spiral arc in a surface 11 such that a specimen 15, when bent to such arc, experiences a uniformly increasing strain on its (the specimen) outer surface. Such a surface 11, when made, provides a linearly increasing strain over the entire length of a specimen 15. In FIG. 4:

$r_i$ designates radius of curvature.

$h_i$, $k_i$ designate coordinates of $r_i$ (center curvature).

$\theta$, $\phi$ designate angles subtended by $r_i$ from previous $r_i$ and with initial X axis respectively.

S designates increment of arc.

$X_i$, $Y_i$ designate coordinates on surface of bending form curve.

T designates thickness of sample.

$R_1$ designates radius of neutral axis.

$CX_i$, $CY_i$ designate coordinates of cutting tool center axis.

This geometry enables one to locate the coordinates of a center of a profile cutter, as in a milling machine, when such cutter is used to machine a surface 11 of a mandrel 10. This geometry shown in FIG. 4 is necessary since the cutter axis has X, Y coordinates which differ from the X, Y coordinates of the work piece being machined since the coordinates of the radius of curvature for the profile cutter are changing continuously to provide linearity of strain with respect to sample length. The general relationship between a work piece and a cutter is given by the following parimetric equations, which are the parimetric equations of the neutral axis, the neutral axis being the mid-point of a specimen 15:

(1)  $X_{n+1} = X_n + R_{n+1} (\cos \phi_{n+1} - \cos \phi_n)$
(2)  $Y_{n+1} = Y_n + R_n (\sin \phi_{n+1} - \sin \phi_n)$ where, $$R_{n+1} = \frac{T(1-N)}{C(S+\Delta S) + E_o}$$

$$\phi_{n+1} = \phi_n - \frac{\Delta S}{R}$$

and $S_o = 0.0$
$\phi_o = 3.14159$
T is thickness of test specimen.
N is distance from inner surface of test specimen to neutral axis divided by thickness.
$E_o$ is initial strain.
S is length of arc.
C is increment of strain per unit length of arc.

$n$ is an integer which designates an increment in effect along a surface 11.

When Equations 1 and 2 are reduced to the coordinates of the workpiece which is to become a mandrel 10, the following equations are developed.

(3) $\quad XM_{n+1} = X_{n+1} - \cos(\phi_{n+1})TN$ (4) $\quad YM_{n+1} = Y_{n+1} - \sin(\phi_{n+1})TN$ wherein the terms are each as above defined except for XM and YM which are used to define the coordinates of the mandrel.

When Equations 1 and 2 are reduced to the coordinates of the axis of the cutter, the following equations are developed:

(5) $XC_{n+1} = XM_{n+1} \pm \cos \phi_{n+1}$(radius of cutter)$+$radius of cutter$-TN$ (6) $YC_{n+1} = YM_{n+1} \pm \sin \phi_{n+1}$ (radius of cutter)

wherein the terms are each as above defined except for XC and YC which are used to define the coordinates of the cutter.

A computer program based upon the above equations can be used to provide calculations for the coordinates of each a workpiece and a cutter for any given:

(A) increment of outer fiber strain per increment of arc (strain gradient).
(B) specimen thickness.
(C) neutral axis multiplier (normally .5). Laminates or composite structures may differ.
(D) radius of profile cutter.
(E) initial strain.

The outer strain on the exposed surface of specimen 15 bent over convex surface 11 may be defined as the thickness of the test specimen divided by two times the radius of curvature of the specimen neutral axis. For example, the radius of the surface 11 in the device 9 can be considered to be such that a 0.100 inch thick specimen bent over the form experiences a linearly increasing strain of .1% per inch of specimen length. The outer (fiber) strain on the specimen 15 can then be considered to range from 0.2% at the origin to 1.0% over a specimen length of 8 inches. A correction curve for the actual strain on the outer fiber of surface 11 in a device 9 should be determined due to small errors in manufacture. For example, if mandrel 10 is a metal (such as aluminum) produced by machining, errors in alignment, errors in master, vibration errors, and the like can result. These errors are in part due to cost-time considerations in cutting of a surface 11. A correction curve can be conveniently developed by bonding a strain gauge such as a Baldwin SR–4–FAP–25–12 on a 10 mil steel feeler gauge with Eastman 910 adhesive and checking the strain along the bending form every .2″ with the strain gauge indicator bridge. The gauge is calibrated on cylindrical shapes of known diameter. The outer fiber strain may be obtained from the relationship given previously except that the specimen thickness is replaced by the strain gauge-feeder gauge-adhesive composite thickness.

EMBODIMENTS

The following examples are set forth to illustrate more clearly the principles and practice of this invention to one skilled in the art and they are not intended to be restrictive but merely to be illustrative of the invention herein contained. The following procedure is conveniently used with (ABS) acrylonitrile-butadiene-styrene resins. The device embodiment used is described above. A 1½″ x 9″ rectangular specimen is cut from .100″±.005″ compression molded or extruded sheet stock (transverse direction) and the specimen gauge recorded. Any rough edges are filed or sandpapered off to provide a perfectly flat surface for contact with the bending form surface. The bending form clamps are loosened and one end of the specimen is inserted under the straps and clamp at the low strain end of the form. The large tightening screw is inserted in the clamp at the other end of the form and tightened securely against the specimen. The strap clamp nuts are hand tightened and then given an additional ¼ turn tension on the clamps. Then the other large screw clamp is used to fasten the specimen securely at the end of the sample. Finally, a line is scribed on the specimen surface at the reference line scored in the form to mark a reference base line from which strain measurements are made. The specimen is now ready for application of the environment.

For non-volatile liquid environments (e.g., a 50–50 cottonseed oil/oleic acid, mixture), the environment is smeared on the sample and allowed to remain in contact at least 18 hours. A strip of filter paper, cloth, or sponge may be soaked in less viscous liquids and placed on the specimen to maintain contact of environment and specimen. For highly volatile liquids, the entir form, sponge etc., are tightly enclosed in aluminum foil or a suitable gas tight container.

With transparent and semi-transparent materials, the cracks or crazes can be visually detected via light reflected from the internal crack or craze surfaces while the sample is either on or off the bending form. With pigmented or opaque materials, the use of an environment containing dye is recommended. Oil red Z1700 (American Cyanamid) has been found effective in dyeing oil environments. The dyed environment remains in the cracks after the excess is wiped off with facial tissue, permitting easy observation of the end point where cracking stops. In the presence of an active environment, cracks are found in the regions of high curvature and continue to a point at which the curvature, and the strain level, fall below the value which causes stress cracking. Only cracks or crazing originating in the center region of the specimen are considered, thus eliminating any possible clamping or specimen edge effects. Actually, due to local compressive stresses, little cracking occurs near the clamping straps. After no further growth in cracks occur along the sample (usually 18 hours), the specimen is removed from the form and wiped clean. Then the point of last crack formation is visually determined and marked with a sharp scribe. The distance between this latest mark and the base line scribe originally made on the specimen is measured to the nearest .01″. By using the previously determined strain correction curve, a "corrected" strain value is then obtained from the measured distance to last crack formation. This corrected strain value is then normalized to .100″ gauge by multiplying by the ratio of actual gauge to standard gauge (.100″). This last strain value is then recorded.

Critical strain values obtained for five thermoplastic polymers in three environments are given in Table 1. The results demonstrate the utility of this procedure over a wide range of polymers and environments. No "lift off" is experienced with the device of this invention.

TABLE 1.—CRITICAL STRAIN VALUES FOR SEVERAL POLYMER-ENVIRONMENT COMBINATIONS

| Material | Percent critical strain | | |
| --- | --- | --- | --- |
| | Isopropanol | Vegetable oil | Hexane |
| Polystyrene | 0.25 | 0.20 | <0.20 |
| Polyvinyl chloride | 0.66 | 0.60 | 0.51 |
| Polycarbonate | >0.85 | >0.85 | 0.70 |
| Polymethyl mechacrylate | 0.24 | 0.52 | 0.55 |
| Acrylonitrile-butadiene styrene terpolymer | 0.27 | 0.60 | >0.85 |

One possible method of circumventing the strain limitations without redesigning the surface 11 is to change the specimen thickness, since the strain at any point on the form is inversely proportional to the specimens thickness. Reducing the thickness to 0.050 inch provides a strain range of 0.100 to 0.45% on the surface 11. Doubling the thickness of 0.200 inch moves the testing range up to 0.40 to 1.8%. A test is made with one material (general purpose polystyrene) to demonstrate the validity of changing specimen thickness. At the same time, form-to-form variability is checked for four forms all machined from the same master. The results are given in Table 2. Analysis of variance indicates that at the 95% confidence level there are no significant form or thickness effects.

TABLE 2.—MATERIAL: GENERAL PURPOSE POLYSTYRENE

| Thickness, inch | Form No. | Percent critical strain after 24 hrs. | |
|---|---|---|---|
| | | Air environment | Isopropanol environment |
| 0.050 | 1 | 0.31 | 0.26 |
| 0.050 | 2 | 0.31 | 0.29 |
| 0.050 | 3 | 0.29 | 0.28 |
| 0.050 | 4 | 0.30 | 0.28 |
| 0.100 | 1 | 0.30 | |
| 0.100 | 2 | 0.34 | |
| 0.100 | 3 | 0.31 | |
| 0.100 | 4 | 0.29 | |
| Average (all runs) $\bar{X}$ | | 0.306 | 0.278 |
| Estimated standard deviation, $\sigma$ | | 0.0146 | 0.0173 |
| Coefficient of variation, $\sigma/\bar{X}$ percent | | 4.8 | 6.2 |

What is claimed is:

1. A strain testing device adapted for testing in the flexural mode environmental stress cracking of a specimen in sheet form of material having generally uniform composition and thickness characteristics, said device comprising:
   (A) an elongated mandrel means having a surface which is transversely flat and which convexly curves in a longitudinally extending direction with respect to said mandrel means,
   (B) clamping means functionally associated with said mandrel means and adapted to hold a said specimen uniformly in face-to-face engagement with said surface, wherein said clamping means includes:
       (1) a pair of flexible band means, each one of said pair being so oriented relative to said surface as to extend longitudinally thereover in the region of a different respective side edge thereof,
       (2) securing means adapted to hold opposite end regions of each of said band means in face-to-face engagement with said surface relative to said mandrel, and
       (3) tensioning means adapted for application against at least one end region of each of said band means whereby said band means may be drawn with variable force against said surface relative to said mandrel,
   (C) the convex, longitudinally extending curvature of said surface being such that strain on the outer surface of a said specimen so held linearly increases with longitudinal distance along said surface in one direction.

2. In a method for testing in the flexural mode environmental stress cracking of a specimen in sheet form of material having generally uniform composition and thickness characteristics, the improvement which comprises the steps of conforming said specimen into a curved configuration which is transversely flat but which is convexly curved in a longitudinally extending direction such that strain on the outer surface of said specimen linearly increases with longitudinal distance along said surface in one direction, and while so conformed, exposing said specimen to a controlled environment for a time at least sufficient for such specimen to develop stress cracking.

3. In a method for testing in the flexural mode environmental stress cracking of a specimen in sheet form of material having generally uniform composition and thickness characteristics, the improvement which comprises the steps of conforming said specimen into a curved configuration which is transversely flat but which is convexly curved in a longitudinally extending direction such that strain on the outer surface of said specimen linearly increases with longitudinal distance along said surface in one direction, and then after said specimen has been so conformed and stress cracking has been produced therein, measuring the distance along said specimen in said one direction to the point of last crack formation.

4. In a method for testing in the flexural mode environmental stress cracking of a specimen in sheet form of material having generally uniform composition and thickness characteristics, the improvement which comprises the steps of:
   (A) conforming said specimen into a curved configuration which is transversely flat but which is convexly curved in a longitudinally extending direction such that strain on the outer surface of said specimen linearly increases with longitudinal distance along said surface in one direction,
   (B) then scribing said specimen with a line extending in a transversely extending direction thereby to provide a reference base line from which strain measurements may be made on said specimen,
   (C) exposing said specimen while so conformed to a controlled environment for a time at least sufficient for said specimen to develop stress cracking and then,
   (D) measuring the distance along said specimen in said one direction from said reference base line to the point of last crack formation.

References Cited

UNITED STATES PATENTS 2,831,344   4/1958   Kaar et al. _____ 73—100

JERRY W. MYRACLE, Primary Examiner

U.S. Cl. XR.

73—87, 104